(12) United States Patent
Schmidt et al.

(10) Patent No.: US 10,233,983 B2
(45) Date of Patent: Mar. 19, 2019

(54) CLUTCH ACTUATING ASSEMBLY

(71) Applicant: GKN Driveline International GmbH, Lohmar (DE)

(72) Inventors: Mark Schmidt, Königswinter (DE); Frank Bernreuther, Königswinter (DE); Kai Sorge, St. Augustin (DE); Rudolf Fitz, Troisdorf (DE); Stephan Leven, Troisdorf (DE)

(73) Assignee: GKN Automotive Limited, Redditch, Worcestershire (GB)

( * ) Notice: Subject to any disclaimer, the term of this patent is extended or adjusted under 35 U.S.C. 154(b) by 267 days.

(21) Appl. No.: 15/301,432

(22) PCT Filed: Apr. 4, 2014

(86) PCT No.: PCT/EP2014/056863
§ 371 (c)(1),
(2) Date: Oct. 3, 2016

(87) PCT Pub. No.: WO2015/149875
PCT Pub. Date: Oct. 8, 2015

(65) Prior Publication Data
US 2017/0184161 A1 Jun. 29, 2017

(51) Int. Cl.
*F16D 48/06* (2006.01)
*F16D 23/02* (2006.01)
*F16D 28/00* (2006.01)

(52) U.S. Cl.
CPC ............. *F16D 48/06* (2013.01); *F16D 23/02* (2013.01); *F16D 28/00* (2013.01);
(Continued)

(58) Field of Classification Search
CPC .......... F16D 48/06; F16D 23/02; F16D 28/00; F16D 2500/3022; F16D 2500/3023;
(Continued)

(56) References Cited

U.S. PATENT DOCUMENTS

| | | | | |
|---|---|---|---|---|
| 2008/0215220 A1* | 9/2008 | Winkel | ................. | B60W 10/02 701/68 |
| 2009/0258757 A1* | 10/2009 | Man | ........................ | F16D 48/06 477/166 |
| 2010/0056336 A1* | 3/2010 | Zdych | ..................... | F16D 48/06 477/179 |

FOREIGN PATENT DOCUMENTS

| | | |
|---|---|---|
| DE | 10 2005 022 926 B3 | 2/2007 |
| DE | 10 2006 011 207 A1 | 9/2007 |

(Continued)

OTHER PUBLICATIONS

International Search Report for PCT/EP2014/056863 dated Dec. 3, 2014 (w English translation; 5 pages).

*Primary Examiner* — Edwin A Young
(74) *Attorney, Agent, or Firm* — Bejin Bieneman PLC

(57) ABSTRACT

A process of controlling an actuating assembly for a coupling in the driveline of a motor vehicle, wherein the actuating assembly comprises a drive for moving an actuating element for operating the coupling unit, sensing a position signal representing the position of the actuating element; sensing a force signal representing the operating force required for displacing the actuating element; controlling the drive by means of an electronic control unit as a function of the position signal and the force signal. Further an actuating assembly is used for carrying out the process, as well as a drive assembly having such an actuating assembly.

18 Claims, 9 Drawing Sheets

(52) U.S. Cl.
CPC ............ *F16D 2500/1045* (2013.01); *F16D 2500/1066* (2013.01); *F16D 2500/10412* (2013.01); *F16D 2500/3022* (2013.01); *F16D 2500/3023* (2013.01); *F16D 2500/3026* (2013.01); *F16D 2500/30415* (2013.01); *F16D 2500/30426* (2013.01); *F16D 2500/50233* (2013.01); *F16D 2500/7041* (2013.01); *F16D 2500/70412* (2013.01)

(58) Field of Classification Search
CPC ... F16D 2500/3026; F16D 2500/50233; F16D 2500/7041
See application file for complete search history.

(56) References Cited

FOREIGN PATENT DOCUMENTS

| | | |
|---|---|---|
| DE | 10 2007 008 977 A1 | 9/2007 |
| WO | 2005093277 A1 | 10/2005 |
| WO | 2005098269 A2 | 10/2005 |
| WO | 2007110131 A1 | 10/2007 |
| WO | 2010012485 A1 | 2/2010 |
| WO | 2012087700 A1 | 6/2012 |

* cited by examiner

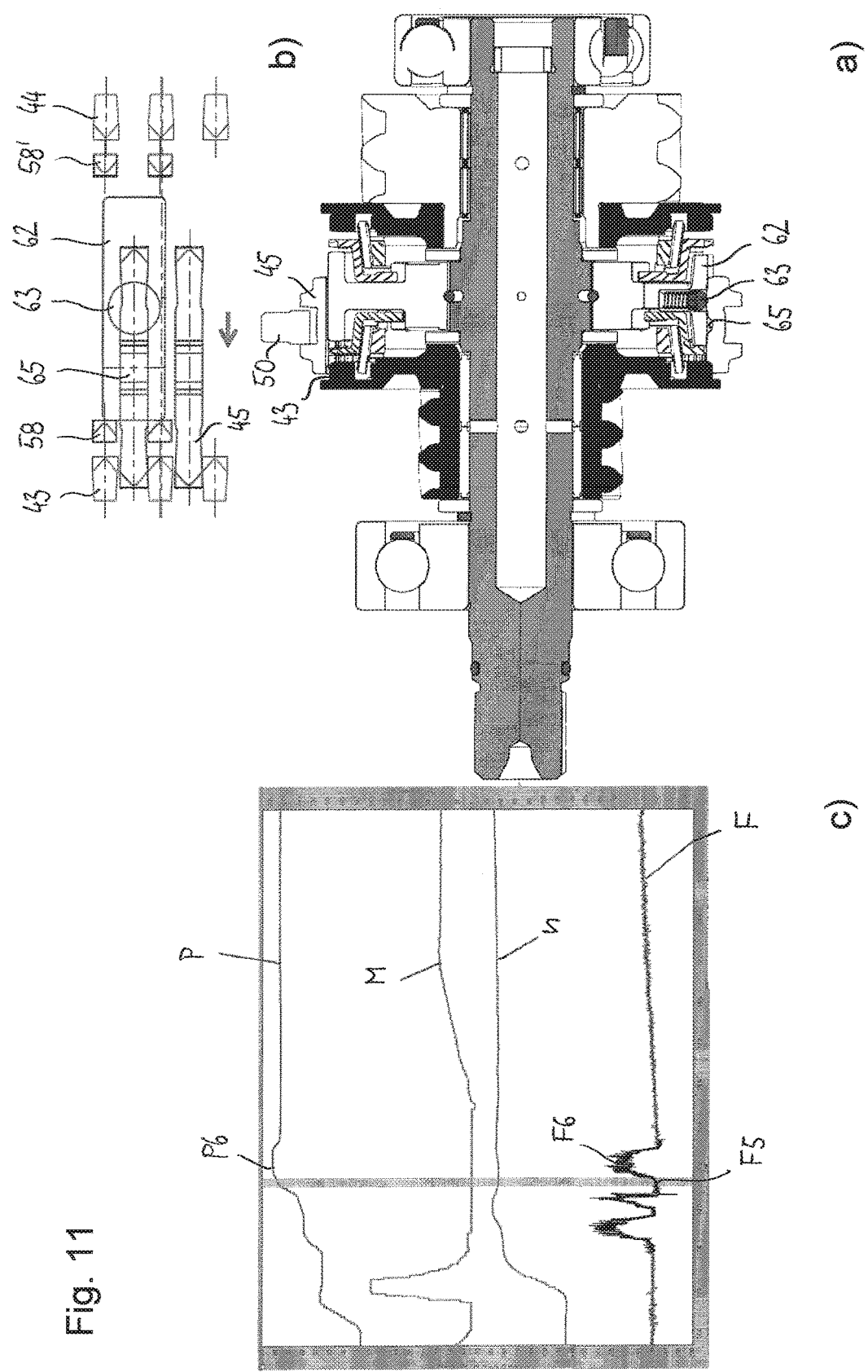

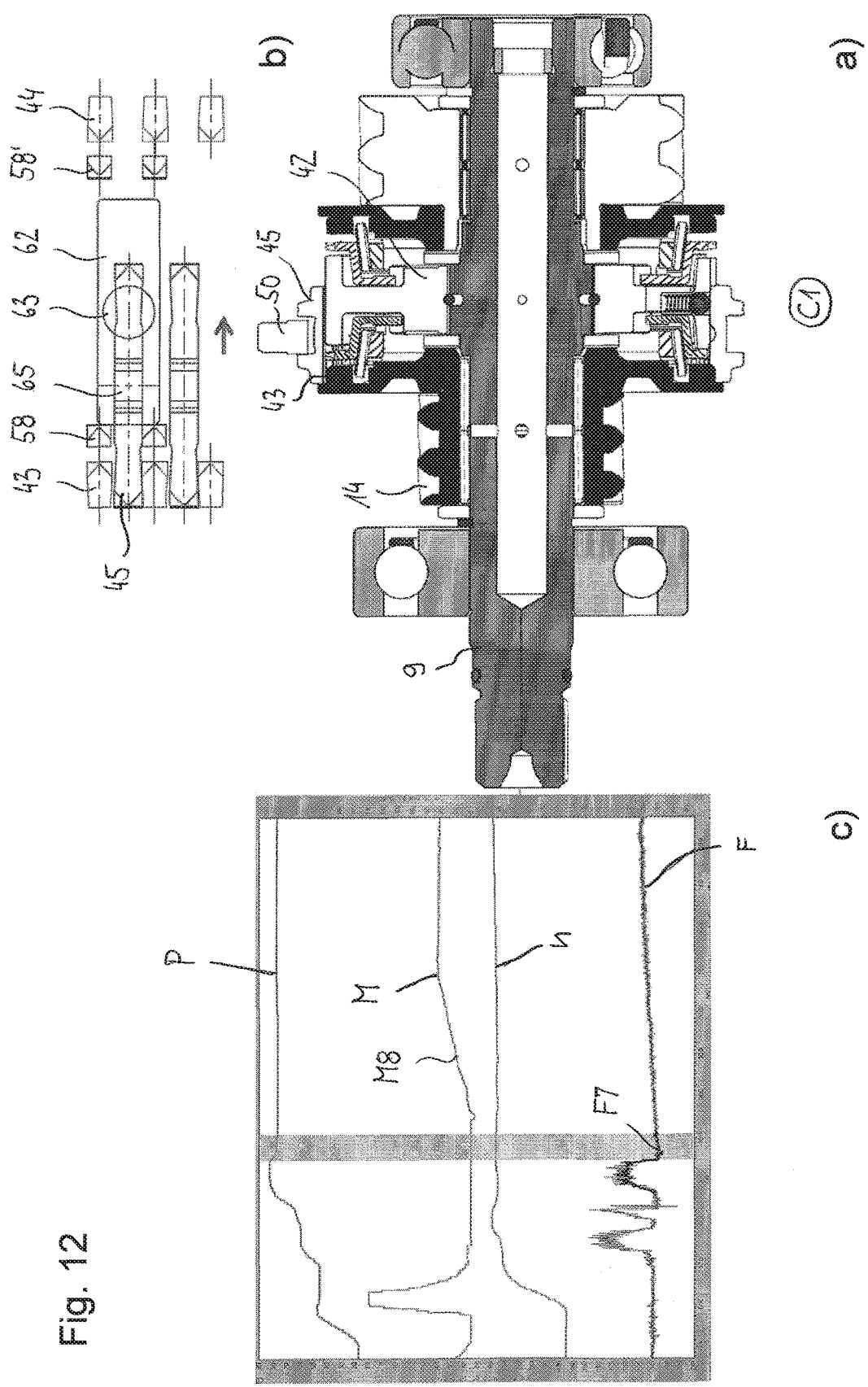

CLUTCH ACTUATING ASSEMBLY

CROSS-REFERENCE TO RELATED APPLICATIONS

This application is a national stage of, and claims priority to, Patent Cooperation Treaty Application No. PCT/EP2014/056863, filed on Apr. 4, 2014, which application is hereby incorporated herein by reference in its entirety.

BACKGROUND

An electric drive can be provided as the only drive for the motor vehicle or it can be provided in addition to an internal combustion engine. In the latter case, the electric drive and the internal combustion engine can drive the vehicle individually or jointly by being superimposed on one another. Such drive concepts are also referred to as "hybrid drives".

Usually, an electric drive comprises an electric motor and a following reduction drive which translates a rotational movement from a high speed into a low speed. From the reduction drive the torque is transferred to the driveline of the motor vehicle. For this purpose, a differential drive following the reduction drive in the torque flow divides the introduced torque to two output shafts for driving the vehicle wheels. The two output shafts of the differential drive have a balancing effect relative to one another, i.e., if one of the two output shafts rotates faster, the other output shaft moves correspondingly slower, and vice versa.

From WO 2012/087700 A1 an electric drive module is known having an electric motor, a planetary drive, a synchronising unit, a reduction drive and a differential assembly. The synchronising unit is operated by an actuator which comprises a rotatingly drivable spindle drive for axially moving a shift fork which cooperates with a sliding sleeve of the synchronising unit.

From WO 2007/110131 A1 an actuating assembly for a shiftable clutch of a multi-step transmission is known. The actuating assembly comprises an electric machine, a rotatable shaft drivable thereby, and an operating member arranged on the rotatable shaft. The operating member is connected to a rotor of the electric machine via a rotation translation convertor.

DE 10 2006 011 207 A1 proposes a sensor assembly for recording a position of a movable element. The sensor assembly comprises a magnetic field sensor which, in different positions of the movable element, records different magnetic field strengths.

From WO 2005/098269 A2 an automatic multi-step transmission is known with several gear stages which can be engaged and disengaged by respective clutches. The clutches are provided in the form of synchronous clutches which are actuated by an axially displaceable switching sleeve. The switching sleeve is operated by a controllable actuator.

DE 10 2005 022 926 B3 proposes a process for optimising the switching sequence of a multi-step transmission of a motor vehicle. The multi-step transmission comprises a plurality of gear stages which can be engaged by respective clutches. The switching sequence provides for a tolerance- and/or wear-dependant parameter to be recorded and for setting a nominal path value of the switching member of the clutch.

Electric drives with multi-step transmissions with switching clutches require a major constructional effort for the clutches and actuators. A multi-step transmission with a synchronising unit requires high switching forces, thus involving high demands to be met by the actuator. Furthermore, production tolerances and the amount of wear occurring during the service life of same can lead to switching inaccuracies.

SUMMARY

The present disclosure relates to an actuating assembly for operating a coupling in the driveline of a motor vehicle, more particularly of a motor vehicle with an electric drive. A process of controlling an actuating assembly for a coupling allows comfortable and high-speed switching and compensation for positional changes as a result of changing tolerances of the individual parts and wear during the service life of same. The disclosure further includes an actuating assembly for carrying out the process, as well as a drive assembly having such an actuating assembly.

A process of controlling an actuating assembly for a coupling unit in the driveline of a motor vehicle, wherein the actuating assembly comprises an actuator drive for moving an actuating element for actuating the coupling, comprises the following steps: sensing a position signal representing the position of the actuating element; sensing a force signal representing the operating force required for moving the actuating element; and controlling the actuator drive by an electronic control unit as a function of the position signal and of the force signal.

As both the position signal and the force signal are taken into account for controlling the actuator drive, a calibration of the actuating assembly can be carried out while in service. In this way, it is possible to consider positional changes occurring during the service life of components which participate in the operation of the coupling. Furthermore, production tolerances and elasticities of the participating components can be compensated in an advantageous way. Overall, the process offers the advantages of particularly robust and reliable control conditions during the entire service life of the coupling and of the actuating assembly.

According to a first possibility, the position signal can be a path signal, i.e., for determining the position of the actuating element a path signal is sensed which represents the path of the actuating element, for instance by means of a contactless path sensor. In addition or as an alternative, the position signal can be a rotational signal, i.e., for determining the position of the actuating element, a rotational signal is sensed which represents the rotational movement of the actuator drive, from which rotational signal the position of the actuating signal is determined.

Possibly, in a first coupling process, an end position of the actuating element which represents an end stop of the coupling unit in the closed condition, is sensed as an abrupt rise of the force signal, and an associated end position value is stored. Furthermore, it is proposed that at least at one later coupling operation, which takes place after the first coupling operation, the end position value is taken into account by the electronic control unit when controlling the actuator drive such that the actuating element is braked before the end position is reached. By braking the actuating element, and a coupling element connected thereto, before the end position is reached, undesirable stopping noises of the coupling unit can be avoided and the switching comfort can be improved. In an example, the end position value is defined on the basis of a position signal sensed at the time of the rapid increase in the force signal. This means that a force signal and an associated position signal are linked, so that conclusions can be drawn on the accurate position of the actuating element and the coupling element connected thereto.

After the end position has been reached, the actuating element—according to an example process—is moved backwards by a defined path into a coupling position axially spaced from the end position. In this way friction forces are avoided in the coupled condition because an axial play is set due to the slight return movement of the actuating element. The axial distance between the end position and the coupled position, i.e., the distance by which the actuating element is returned, can amount to a value between zero and 1.0 millimeter (mm). Depending on the amount of wear, this distance can be readjusted, which prolongs the functioning and the service life of the transmission and possibly of the synchronising mechanism.

During a later coupling operation, the actuator drive can be controlled such that the actuating element is moved directly into the coupled position, i.e., is stopped in the coupled position before the end position is reached. In this way, an undesirable stopping noise is prevented, wherein nevertheless the coupled position is securely reached due to the previous calibration at the end stop. The term "later coupling operation" refers to any coupling operation which, in terms of time, follows a previous coupling operation in which the control system was calibrated by moving up to the end stop. Whether the coupled position is approached directly or only after a previous stopping against the end position can be set according to the requirements and can be based on algorithms stored in the electronic control unit. For example, it can be defined that the coupling position should be reached directly if a fast coupling operation is required for instance in the case of changing from one gear into the next during an acceleration process. The coupled position can be reached indirectly after previously moving to the end stop during a coupling operation under normal load. The coupling position can also be referred to as a gear position. Only by having transmission-specific knowledge of the positions can a gear position be engaged directly without concurrently reducing the switching robustness. The risk that the distance from the end stop is too great, with the gear undesirably jumping out of its position is clearly reduced.

The coupling unit can comprise a synchronising mechanism which, when the actuating element is in a synchronising position, equalises a first rotational speed of a coupling input part and a second rotational speed of a coupling output part relative to one another. In an example with a synchronising mechanism, the actuator drive can be controlled such that during the coupling operation the travel speed of the actuating element is reduced before the synchronising position is reached. In this case, too, control can take place by taking into account the requirements for the driving behaviour of the motor vehicle. If a comfortable coupling and gear changing operation is required, the travel speed can be reduced before the synchronising position is reached in order to avoid undesirable gear changing noises. After the synchronising operation, i.e., when a relative speed differential between the coupling input part and the coupling output part has dropped below a predetermined speed differential value, the travel speed of the actuating element can be increased again for the purpose of being moved into the coupling position. However, if rapid coupling and gear changing is the priority, the actuating element can also be moved into the coupling position at an unchanged travel speed.

According to a possible process, the actuating element is returned into the neutral position if, after a predetermined period of time, the relative rotational speed differential between the coupling input part and the coupling output part is still greater than the predetermined value of the rotational speed differential. This predetermined period of time up to cancellation of the coupling operation, can range, more particularly, between 0.3 and 0.7 seconds.

According to a possible embodiment, the actuator drive for the actuating element can be provided in the form of an electric motor, with other drives such as hydraulic and pneumatic rotary drives also being possible. In the case of electrically driven drives, the process step of sensing the force signal can comprise the following sub-steps: sensing the electric current of the actuator drive and calculating the force of the actuating element on the basis of the determined electric current, and/or current demand, of the actuator drive. In this manner, use is made advantageously of a signal which is anyway available, i.e., a signal representing the electric current requirements of the actuator drive.

Further provided is an actuating assembly for operating a coupling unit for the driveline of a motor vehicle, more particularly for an electrically drivable driveline of a motor vehicle, with the actuating assembly comprising: an actuator drive with a rotatingly drivable shaft; a rotation translation convertor which converts a rotational movement of the shaft into a translatory movement of an actuating element; first sensor means which sense a position signal representing the translatory movement of the actuating element; second sensor means which sense a force signal representing the force of the actuator drive; and an electronic control unit for controlling the actuator drive, wherein the electronic control unit is connected to the first sensor means and to the second sensor means for using the position signal and the force signal for controlling the actuator drive.

The actuating assembly achieves the same advantages as the above-mentioned process to the description of which reference is hereby made. It is understood that all examples mentioned in connection with said process can also be transferred to the device (actuating assembly) and apply to same, and vice versa, all device features also apply to the process. As a result of the two sensor means, the inventive actuating assembly allows calibration, so that all the changes which occur in the course of the service life can be taken into account when controlling the actuating assembly. In consequence, the actuating assembly operates in a particularly robust and reliable way, i.e., the risk of erroneous gear changing is minimised.

According to a first possibility, the first sensor means comprise a path sensor, more particularly a contactless path sensor, which, at least indirectly, senses a movement of the actuating element in the form of a position signal. For this, the first sensor means can comprise a magnetic field sensor, for example, which is arranged in a housing of the actuating assembly and is able to sense the movement of a sensor target connected to the actuating element. The axial position of the sensor target can be sensed by the sensor in a contactless manner. The sensor target, for example a magnet, can be connected directly to the actuating element, or indirectly via a component connected to the actuating element. According to an additional or alternate second possibility, the first sensor means can comprise a rotational angle sensor which, at least indirectly, senses a rotational movement of the actuator in the form of a position signal, wherein the position of the actuating element is determined from the sensed rotational movement of the actuator drive.

The second sensor means can comprise an electric current sensor which senses the electric current demand of the actuator drive. From said electric current demand the axial force effective at the actuating element can be calculated in a calculating unit. The rotation-translation convertor can comprise a threaded spindle having a spindle part which is rotatably drivable by the shaft and a translation part which is threaded to the spindle part. The translation part is guided relative to a housing in a rotationally fixed and longitudinally movable way, so that a rotation of the spindle part causes an axial movement of the translation part. Possibly, the translation part is sleeve- or tube-shaped and comprises an inner thread at one end portion, which inner thread is threaded on a corresponding outer thread of the spindle part. At both end portions, the tubular translation part can be supported in the housing so as to be longitudinally movable. The actuating element which can be provided in the form of a switch fork is fixed to the translation part so that it is axially moved jointly therewith. The sensor target for the path sensor is preferably connected to the translation part.

Further provided is a drive assembly having a coupling unit and an actuator assembly for a motor vehicle driveline drivable in particular by an electric motor, which drive assembly can comprise one or several of the above-mentioned embodiments. The coupling unit can comprise one or several couplings. By means of the actuating assembly, the coupling unit can selectively be transferred into a coupling position in which torque is transmitted between a coupling input part and a coupling output part, and into a neutral position in which the coupling input part and the coupling output part are freely rotatable relative to one another.

The drive assembly can form in particular part of an electric drive, which comprises an electric motor for driving the vehicle driveline. Alternatively, the drive assembly can be part of a disconnectable all-wheel system, i.e., a disconnect system for an all-wheel drive motor vehicle. Both examples, i.e., electric drive or a disconnect system, are characterised by a high mass inertia, so that here sensitive actuator control based on position and force signals is particularly suitable to allow an adjustment with other systems.

According to an example, the coupling unit comprises a synchronising mechanism which, before the respective coupling is closed, effects an adjustment of rotational speeds between the coupling input part and the coupling output part.

The coupling input part is preferably connected to a driveshaft in a rotationally fixed way, and the coupling output part is connected in a rotationally fixed way to a driving gear which is rotatably supported on the driveshaft.

According to an example, a second coupling can be provided which can optionally be transferred into a closed position or into an open position of the actuating assembly. The second coupling output part can be connected in a rotationally fixed way to a second driving gear which is rotatably supported on the driveshaft. In this case, the first and the second coupling can form parts of a multi-step transmission which, by closing the first coupling, can transmit torque via a first gear stage with a first transmission ratio from the input shaft to the output shaft, or accordingly, by closing the second coupling, can transmit torque with a second transmission ratio.

Possibly there is provided a coupler which is connected in a rotationally fixed way to the actuating element of the actuating assembly, wherein the coupler can be transferred into the following positions: a neutral position in which the coupling input part, the first coupling output part and the second coupling output part are freely rotatable relative to one another; a first coupled position in which the coupling input part is connected to the first coupling output part for transmitting torque; or into a second coupled position in which the coupling input part is connected to the second coupling output part for transmitting torque. According to an example, the coupler is provided in the form of a sliding sleeve which is held relative to the coupling input part so as to be rotationally fixed and axially displaceable. By operating the actuating assembly, the sliding sleeve can optionally be transferred into said positions.

SUMMARY OF THE DRAWINGS

Examples will be described below with reference to the drawings wherein:

FIG. 11A shows the assembly according to FIG. 3 in a form-locking position in a longitudinal section;

FIG. 11B shows, for the assembly according to FIG. 3 in a form-locking position, part of the gear teeth in a developed view;

FIG. 11C shows, for the assembly according to FIG. 3 in a form-locking position, the characteristic curve diagram according to FIG. 8C;

FIG. 12A shows the assembly according to FIG. 3 in a coupled position C1 in a longitudinal view;

FIG. 12B shows, for the assembly according to FIG. 3 in a coupled position, C1 part of the gear teeth in a developed view; and FIG. 12C shows, for the assembly according to FIG. 3 in a coupled position, C1 the characteristic curve diagram according to FIG. 8C.

DETAILED DESCRIPTION

Figure 1:
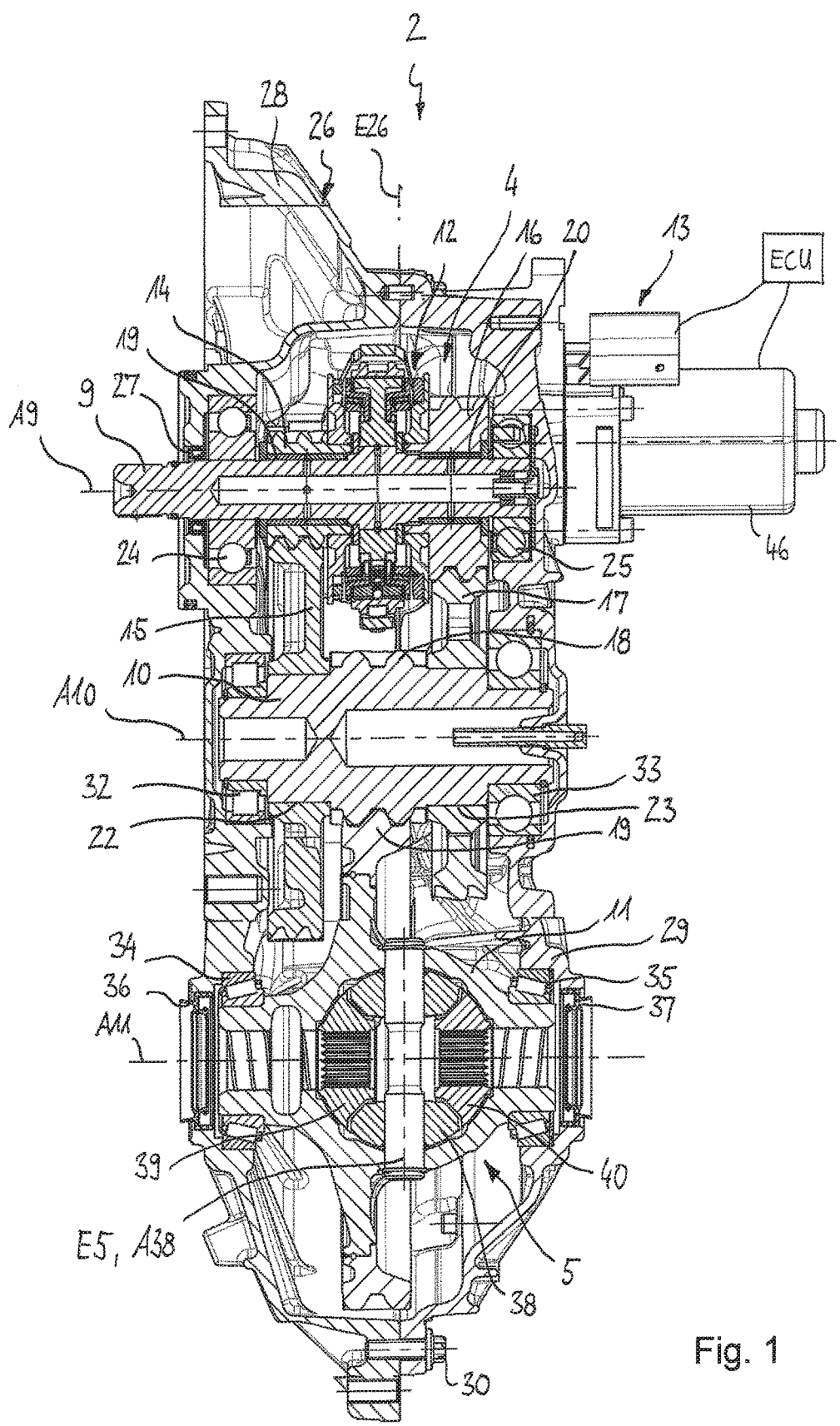
FIG. 1 shows an example drive assembly having an actuator assembly in a sectional illustration.

FIGS. 1 to 7 will be described jointly below. FIG. 1 shows an actuating assembly 1 as part of a drive assembly 2. The drive assembly 2 comprises an electric motor 3, a multi-step transmission 4 and a differential drive 5. The electric motor 3, the multi-step transmission 4, and the differential drive 5 jointly form an electric drive for driving a driving axle of a motor vehicle. The electric drive can be used as the only driving source or together with an additional driving source.

The electric motor 3 comprises a stator 6 and a rotor 7 which is rotatable relative thereto and which, when the electric motor 3 is supplied with electricity, rotatingly drives a motor shaft 8. The rotational movement of the motor shaft 8 is transmitted to the driveshaft 9 of the multi-step transmission 4. The electric motor 3 is supplied with electric current by a battery, wherein the battery can be charged by the electric motor 3 in a generator mode.

The multi-step transmission comprises two transmission stages, so that the introduced torque can be transmitted from the driveshaft 9 to the intermediate shaft 10 with two different transmission ratios i1, i2. The intermediate shaft 10 is drivingly connected to the differential carrier 11 of the differential drive 5. By means of the differential drive 5, the introduced torque is split up between two sideshafts 81, 82 for driving the vehicle wheels. There is provided a coupling unit 12 which can be operated by an actuator 13 for switching the multi-step transmission 4 optionally into the neutral position, the first gear or into the second gear. The construction and the mode of operation of the coupling unit 12, which can also be referred to as a switching unit, will be described in greater detail below.

The multi-step transmission 4 is provided in the form of a reduction drive so that a rotational movement introduced by the electric motor 3 is transferred from a high speed to a low speed. The first reduction stage comprises a first driving gear 14 rotatably supported on the driveshaft 9 and a first intermediate gear 15 connected to the intermediate shaft 10 in a rotationally fixed way, said gears 14, 15 engaging one another. The first driving gear 14 and the first intermediate gear 15 form a first gear set with a first transmission ratio i1 which can range between 3.0 and 4.0. The second reduction stage comprises a second gear 16 which is rotatably supported on the driveshaft 9 and a second intermediate gear 17 connected to the intermediate shaft 10 in a rotationally fixed manner, said gears 16, 17 engaging one another. The second driving gear 16 and the second intermediate gear 17 form a second gear set with a second transmission ratio i2 which can range between 1.3 and 2.3. A third reduction stage comprises the output gear 18 which is connected in a rotationally fixed way to the intermediate shaft 10, and the annular gear 19 which engages the output gear 18 and which is fixedly connected to the differential carrier 11. The output gear 18 of the intermediate shaft 11 and the annular gear 19 form a third gear set with a third transmission ratio i3 which can range between 2.4 and 3.4.

By means of first bearing means 24, 25, the driveshaft 9 is supported in a housing 26 of the drive assembly 2 so as to be rotatable around a first rotational axis A9. The annular chamber formed at the input end of the driveshaft 9 between the shaft and the housing 26 is sealed by a radial shaft sealing ring 27. The driving gears 14, 16 are rotatably supported via bearing means 20, 21 on the driveshaft 9. By means of second bearing means 32, 33, the intermediate shaft 10 is supported in the housing 26 so as to be rotatable around a second rotational axis A10. The bearing means 32, 33 are rolling contact bearings which are provided at ends of the intermediate shaft 10. The output gear 18 is produced so as to be integral with the intermediate shaft 10 and arranged axially between the first and the second intermediate gears 15, 17. The intermediate gears 15, 17 are connected to the intermediate shaft 10 in a rotationally fixed way via splines 22, 23, more particularly with an interference fit. The driveshaft 9, the intermediate shaft 10, and rotational axis A11 of the differential carrier 11 extend parallel relative to one another. The output gear 18 of the intermediate shaft 10 has at least a partial axial overlap with the central differential plane E5. The housing 26 comprises a first housing part 28 and a second housing part 29 which are connected to one another in a joining plane E26 by suitable connecting means 30 such as threaded connections. Furthermore, the joining plane E26 of the housing 26 is arranged so as to axially overlap the output gear 18 of the intermediate shaft and the coupling unit 12 respectively.

The output gear 18 of the intermediate shaft 10 engages the annular gear 19 of the differential carrier 11 in order to introduce torque into the differential. The differential carrier 11 which can also be referred to as differential cage is supported in the housing 26 by bearing means 34, 35 so as to be rotatable around the rotational axis A11, and sealed by radial shaft sealing rings 36, 37. Furthermore, the differential 5 comprises a plurality of differential gears 38 which are supported in the differential carrier 11 on an axis A38 which extends perpendicularly relative to the rotational axis A11; the differential 5 also comprises two sideshaft gears 39, 40 which are arranged coaxially relative to the rotational axis A11 and which engage the differential gears 38. Two opposed differential gears 38 are rotatably supported on a journal 41 which is inserted into bores of the differential carrier 11 and is axially fixed relative thereto. The axis A38 of the differential gears 38 defines a central differential plane E5. Torque introduced by the annular gear 19 into the differential carrier 11 is transmitted via the differential gears 38 to the two sideshaft gears 39, 40, between which there is a differential effect. The two sideshaft gears 39, 40 are connected to the associated sideshafts 81, 82 to transmit torque thereto, which sideshafts 81, 82 transmit the introduced torque to the wheels 83, 84 of the motor vehicle, as shown in FIGS. 4 to 7. The two sideshaft gears 39, 40 each comprise inner splines which can be engaged in a rotationally fixed way by the outer splines of an associated sideshaft for transmitting torque.

Figure 2:
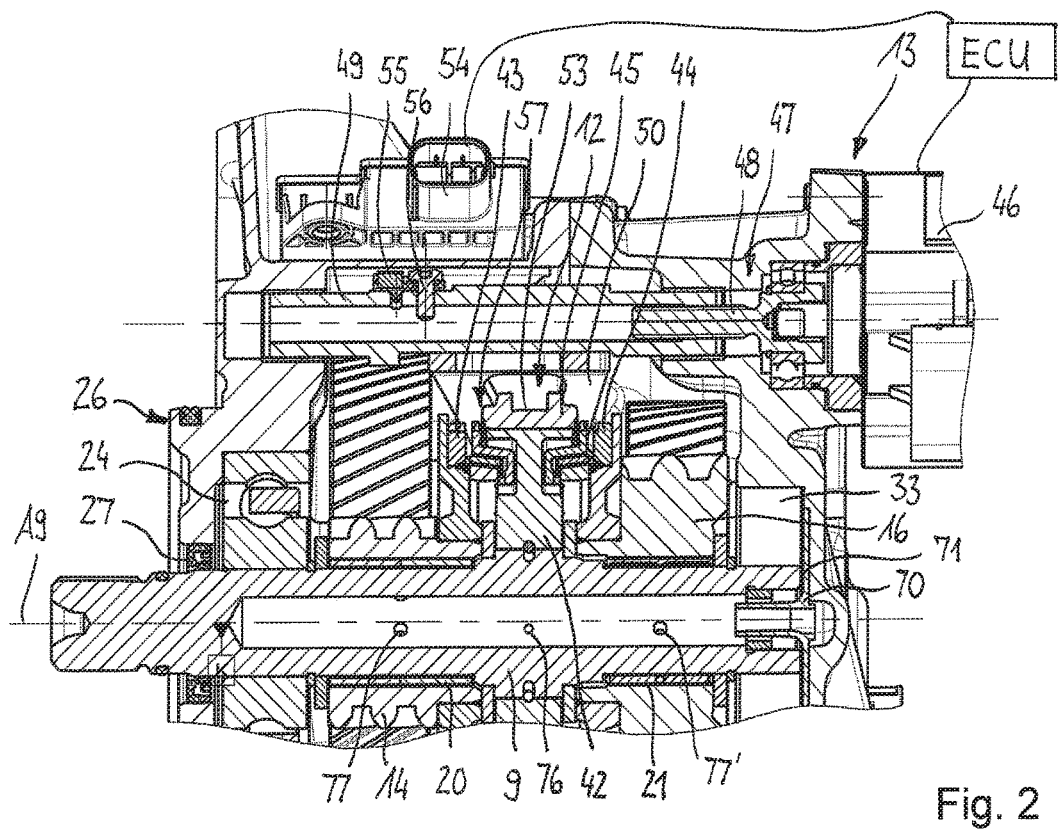
FIG. 2 shows the actuating assembly according to FIG. 1 in the form of a detail.
Figure 3:
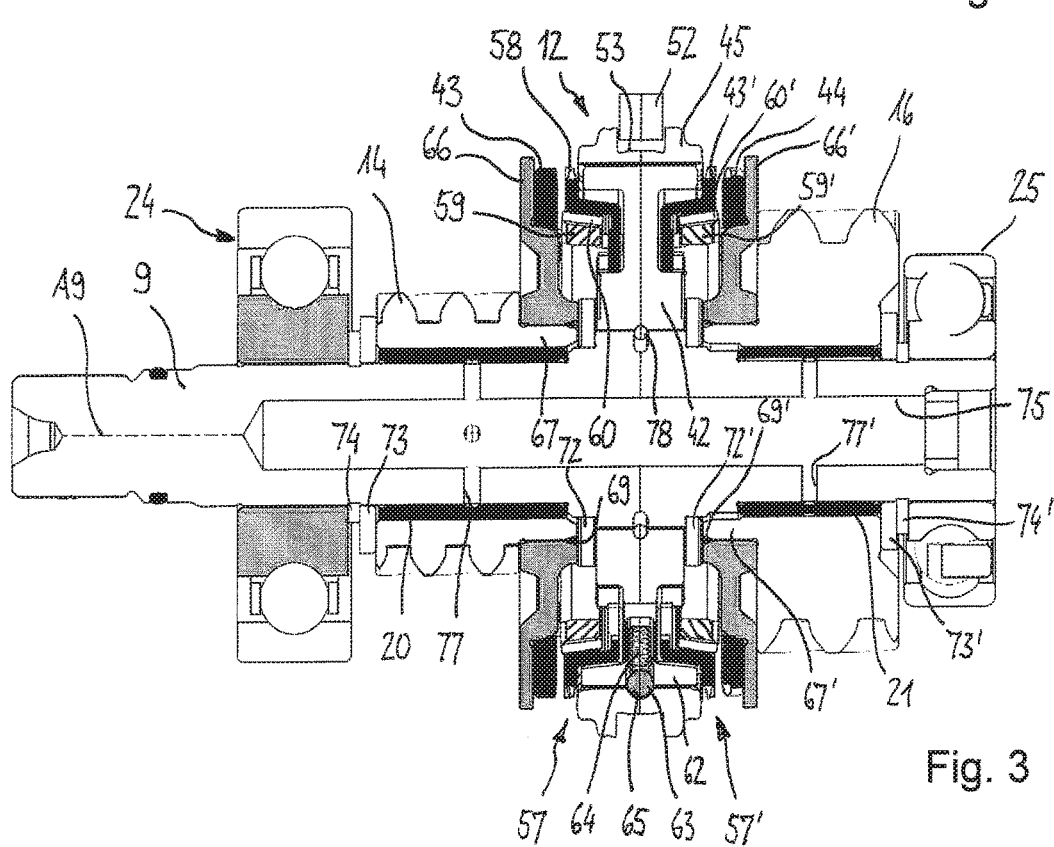
FIG. 3 shows the driveshaft of FIG. 1 and FIG. 2 respectively, and the components mounted thereon, in the form of a detail.

The coupling unit 12 which is shown in detail in FIGS. 2 and 3 is arranged axially between the first driving gear 14 and the second driving gear 16. The coupling unit comprises an input part 42 which is connected in a rotationally fixed way to the driveshaft 9 and axially fixed thereto, a first output part 43 which is firmly connected to the first driving gear 14, and a second output part 44 which is firmly connected to the second driving gear 16. A coupler 45 is provided which can connect the input part 42 optionally with the first output part 43 or the second output part 44 for transmitting torque. Said coupler part 45 is provided in the form of a sliding sleeve which is held on the input part 44 in a rotationally fixed and axially displaceable way.

The sliding sleeve 45 is operated via the inventive actuating assembly 1. The actuating assembly 1 comprises a drive 46 in the form of an electric motor and a rotation translation convertor 47 which converts a rotational movement into a linear movement. The convertor unit 47 is provided more particularly in the form of a threaded spindle and comprises a rotatingly drivable spindle part 48 and a translation part 49 threaded thereon which is axially moved if the spindle part rotates. An actuating element 50 in the form of a switch fork is fixed to the translation part 49 which is provided in the form of a shaft tube. The switch fork 50, with two sliding blocks, engages an annular groove 53 of the sliding sleeve 45. The actuating assembly 1 can be controlled by an electronic control unit ECU and is controlled by same according to the requirements, depending on the actual or desired driving conditions of the motor vehicle.

To achieve accurate control and positioning of the switching sleeve 45, there are provided first sensor means 54 which record a signal representing the axial position of the switch fork 50 and of the switching sleeve 45 respectively and transmit same to the control unit. The first sensor means 45 are provided in the form of a contactless path sensor, more particularly as a magnetic field sensor or an inductive sensor. Using a contactless sensor has the advantage of low performance losses and a small amount of wear. The contactless sensor cooperates with a sensor target 55, with the sensor 54 sensing the axial position of the sensor target 55 and passing on a corresponding sensor signal to the electronic control unit. The sensor target 55 is connected to the spindle sleeve 49, so that, when the actuator 13 is operated, it is axially moved together with same. The sensor target 55 is received in a carrier element which is fixed to the spindle sleeve by a threaded connection 56. As an alternative to the path sensor, a rotational angle sensor can be used for determining the position of the switch fork, too, which senses the rotational movement of the actuator drive 46, from which the position of the switch fork is determined.

Additionally, for controlling the actuator assembly 1, use is made of the data recorded by second sensor means. Said second sensor means sense, more particularly, a value representing the force required for axially moving the sliding sleeve 45 and, respectively, the spindle sleeve 49. For example, an electric current signal can be used for controlling the actuator, which signal is representative of the force that has to be applied for driving the spindle part 48. The second sensor means can also be referred to as a force sensor.

The coupling unit 12 further comprises, per output part 43, 44, a synchronising mechanism 57, 57' by which—prior to the switching operation—the rotational speeds of the components to be connected, i.e., the input part 42 and the respective output part 43, 44, are equalised. As the synchronising mechanisms 57, 57' have the same structure, only one of same will be described. The synchronising mechanism 57 comprises an outer ring 58 with an inner cone, an inner ring 59 with an outer cone, and an intermediate ring 60 arranged therebetween. The outer ring 58 is connected to the input part 42 in a rotationally fixed way such that both rotate jointly around the rotational axis A9, with a limited relative moment between the input part 42 and the outer ring 58 being possible. The intermediate ring 60 is connected to the output part 43 in a rotationally fixed way. The inner ring 59, in turn, is connected to the input part 42 in a rotationally fixed way. This arrangement ensures that the sliding sleeve 45 and the respective outer part 43, 44 can only engage one another when both jointly rotate at the same rotational speed, i.e., until they have been synchronised. Synchronisation is achieved by a plurality of circumferentially distributed catch members 62 which are connected to the input part 42 in a rotationally fixed manner such that they rotate jointly with same. By axially moving the sliding sleeve 45, the catch members 62 are loaded against the outer ring 58, so that friction locking occurs at the pairs of surfaces between the outer ring 58 and the intermediate ring 60 on the one side, and between the intermediate ring 60 and the inner ring 59 on the other side. Said friction locking leads to an equalisation of rotational speeds between the input part 42 and the respective output part 43, 44. If the parts to be connected rotate synchronously, the sliding sleeve 45 can be fully displaced into the engaging position, so that the input part 42 and the respective output part 43, 44 are connected to one another for transmitting torque. The catch members 62 are connected to the sliding sleeve 45 via a respective ball 63 which is pretensioned radially outwardly by a spring 64. Thereby, the ball 63 form-lockingly engages an inner groove 65 of the sliding sleeve 45. If the axial operating force of the sliding sleeve 45 exceeds the holding force of the ball 63, the ball 63 is moved radially inwardly against the pretensioning force of the spring 64, so that the sliding sleeve is displaced further towards the respective output part 43, 44.

The first output part 43 is firmly connected to a first ring 66, more particularly welded to it. For this, the first ring 66 comprises an annular recess in which the output part 43 is positioned. On the radial inside, the first ring 66 comprises a hub portion which is positioned on a sleeve projection 67 of the first driving gear 14 and is welded thereto (69). The first output part 43, the first ring 66 and the first driving gear 14 jointly form a first toothed wheel which is rotatably supported on the driveshaft 9 via the bearing means 19. The bearing means 20, 21 are provided in the form of slide bearings and comprise two bearing bushes, with other suitable bearing means also being possible. In the axial direction the first toothed wheel is fixed between a first disc 72 and a second disc 73. The first disc 72 is positioned on a seat face of the driveshaft 9 with an interference fit and is axially supported against a shoulder of the driveshaft. The second disc 73 is supported via a securing ring 74 relative to the driveshaft in the opposite axial direction. The second output part 44, the second ring 66', and the second driving gear 16, correspondingly, form a second toothed wheel which is designed analogously to the first toothed wheel. To that extent, as far as joint features are concerned, reference is made to the description of the first toothed wheel, with details corresponding to one another having been given the same reference numbers with indices.

In order to achieve good lubricating conditions and a long service life, the driveshaft 9 has a longitudinal bore 75 and for a seat face for the wheels 42, 14, 16 arranged thereon, several circumferentially distributed transverse bores 76, 77, 77'. The input part 42 is connected to the driveshaft 9 by a press fit. For axial securing purposes, a securing ring 78 is provided which engages corresponding annular grooves of the driveshaft, respectively of the input part.

Figure 4:
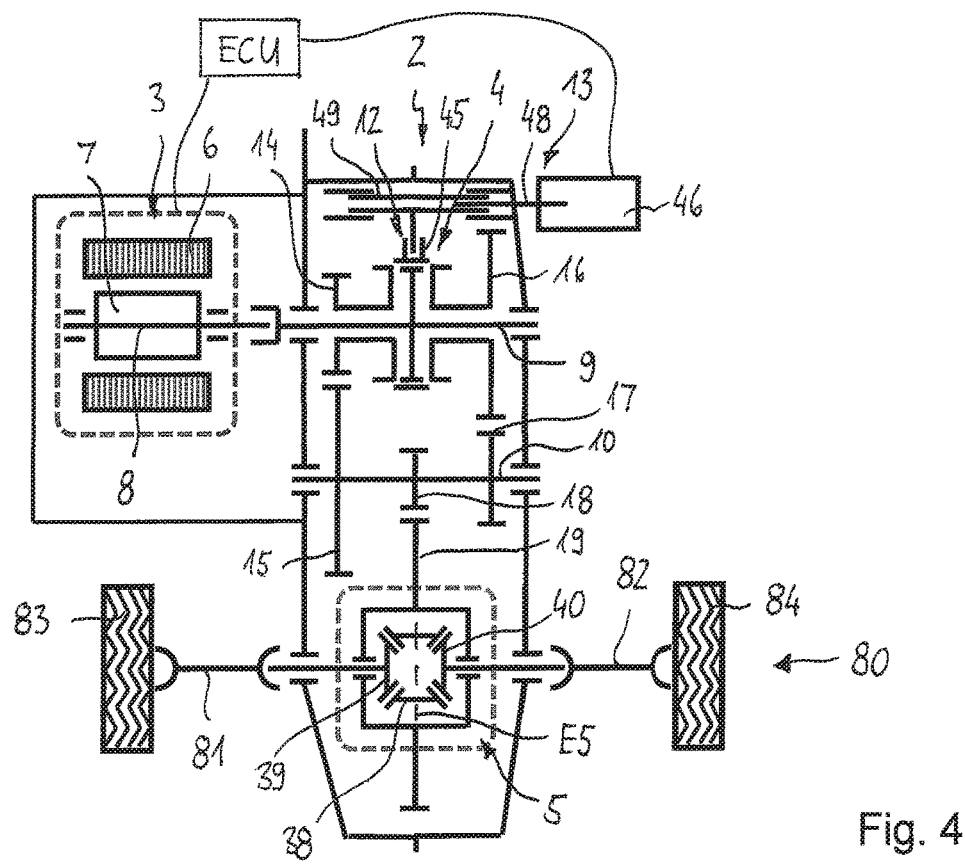
FIG. 4 shows schematically an example drive assembly with an electric motor.

Below, with special reference to FIGS. 4 to 7, the switching mechanism of the drive assembly 2 will be explained. FIG. 4 is a diagrammatic illustration of the drive assembly 2 with an electric motor 3 for driving the vehicle axle 80. One can see sideshafts 81, 82 and the wheels 83, 84 of the vehicle axle 80, connected thereto.

As described above, the drive assembly 2 comprises a two-stage transmission which is formed by a first power path and a functionally parallel second power path. By controlling the coupling unit 12 accordingly, torque can optionally be transmitted via the first power path or alternatively, via the second power path from the electric motor 3 to the differential 5 and the driving axle 80 respectively.

Figure 5:
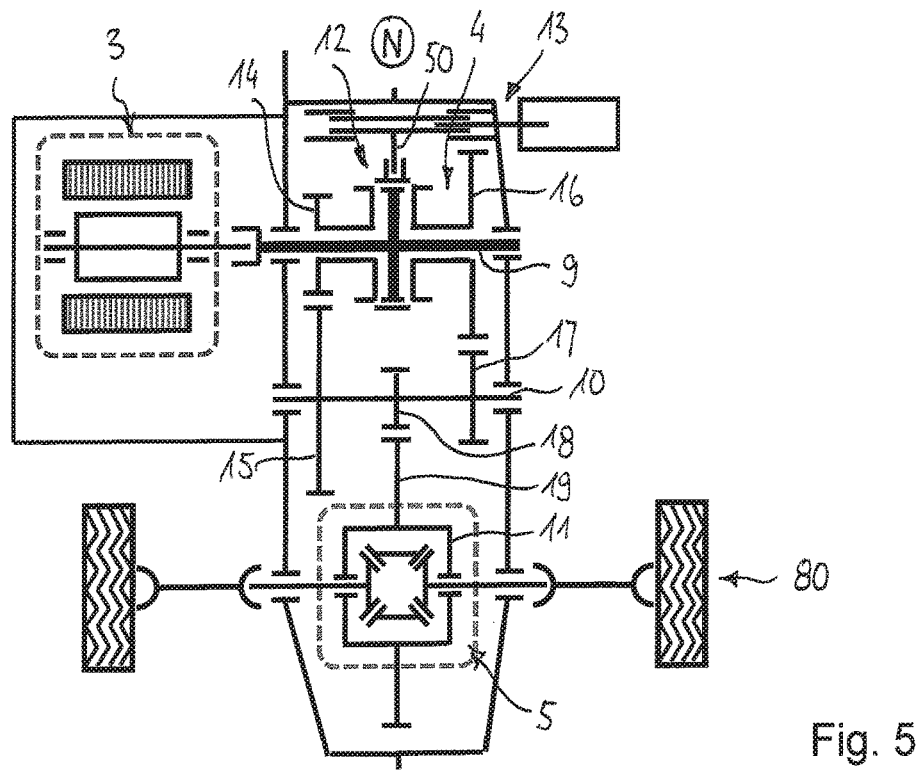
FIG. 5 shows the drive assembly according to FIG. 4 in a neutral position (N)

FIG. 5 shows the coupling unit 12 in the neutral position (N), which can also be referred to as the idling position. The components which are drivingly connected to the electric motor 3 are shown in bold lines. It can be seen that in the neutral position, the switching sleeve 45 is in a central position. In this position, the electric motor 3 and the differential 5 are disconnected from one another, so that no torque is transmitted between the sideshafts 81, 82 and the electric motor 3. This is necessary for example if the vehicle has to be towed away in the case of an accident.

Figure 6:
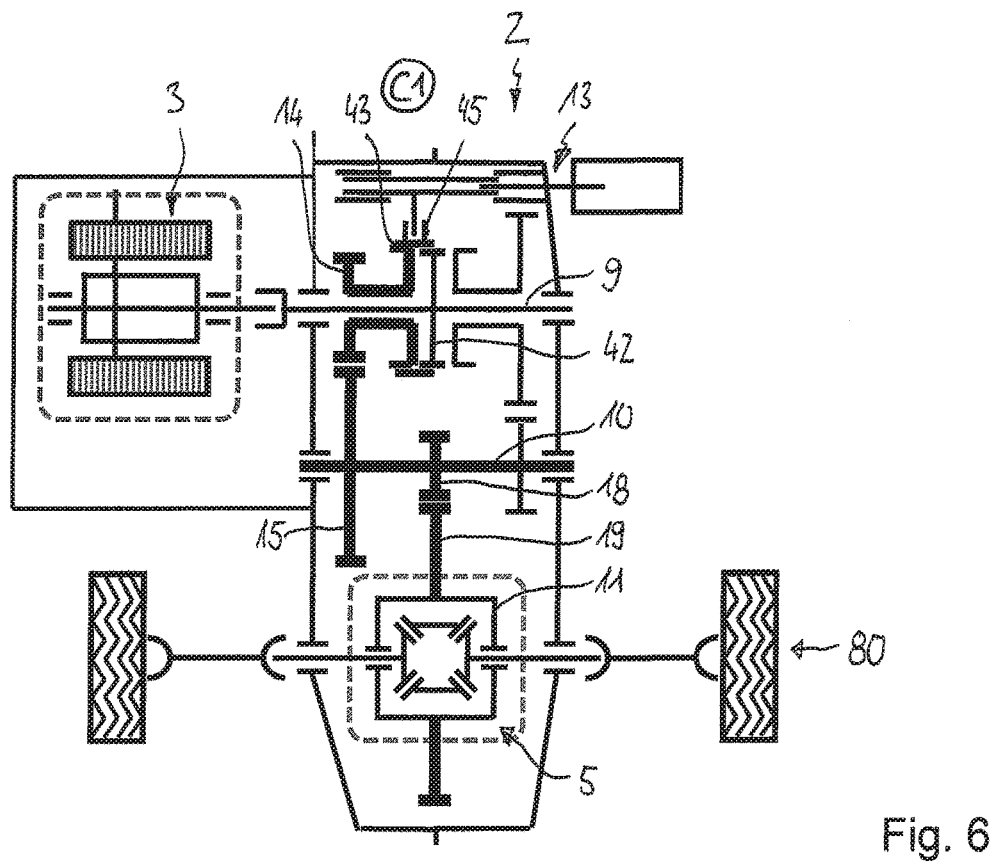
FIG. 6 shows the drive assembly according to FIG. 4 in a first switched position (C1)

In a first switched position (C1), which is shown in FIG. 6, the sliding sleeve 45 is connected in a rotationally fixed way to the first output part 43, respectively the first driving gear 14. Torque is transmitted from the electric motor 3 to the differential 5 via the first power path which is shown in bold lines. The first power path comprises the driveshaft 9 driven by the electric motor 3, the input part 42, the first driving gear 14, the first intermediate gear 15, the intermediate shaft 10 and the output gear 18 which engages the annular gear 19 for driving the differential 5.

Figure 7:
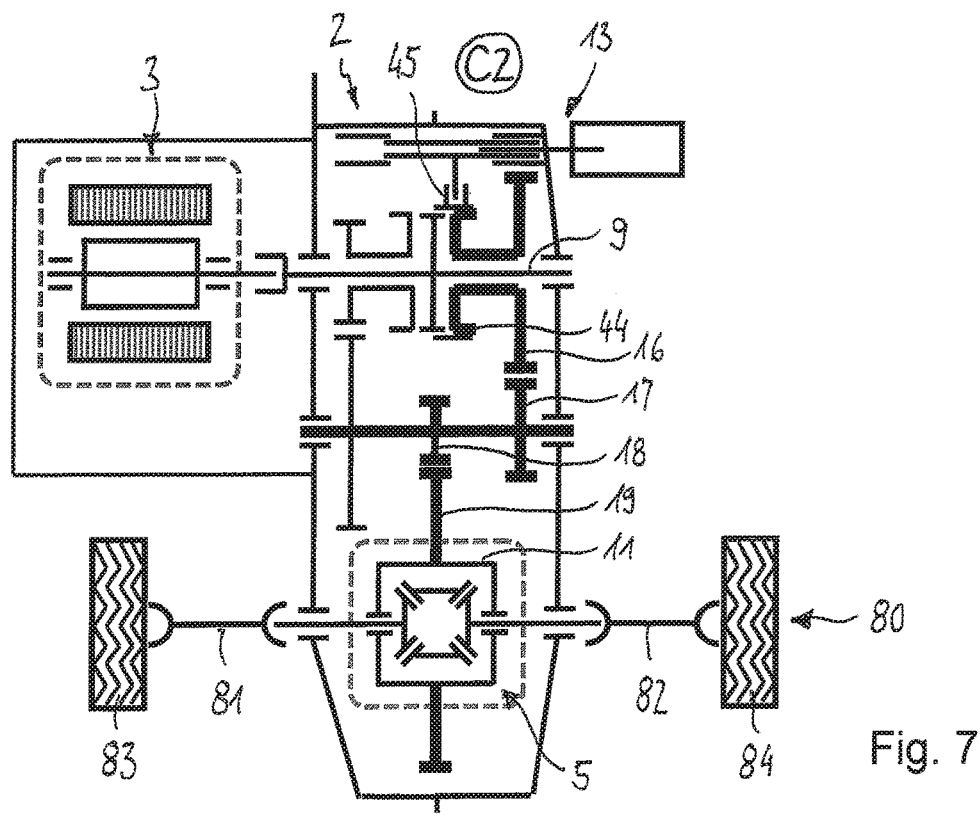
FIG. 7 shows the drive assembly according to FIG. 4 in a second switched position (C2)
Figure 8:
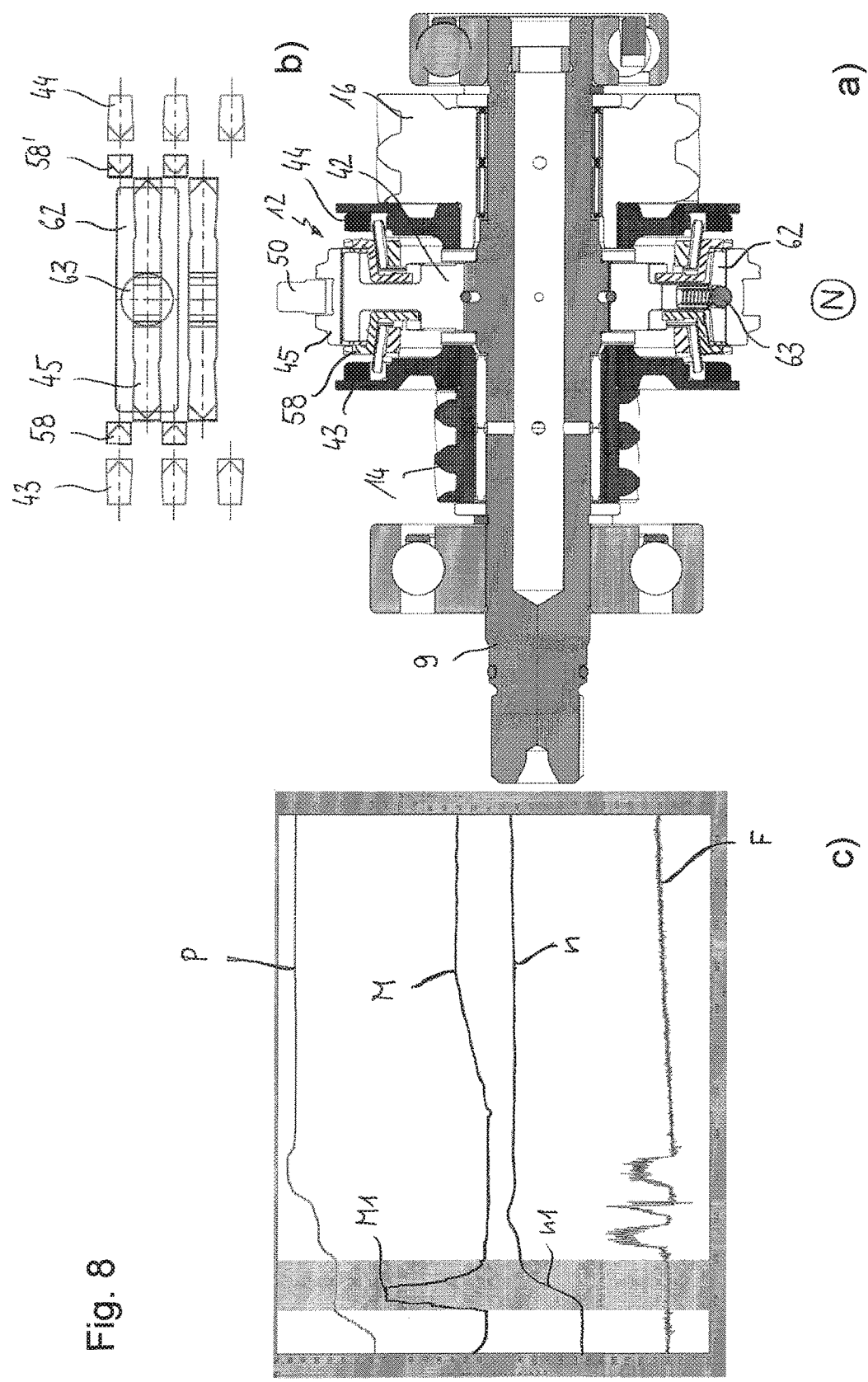
FIG. 8A shows the assembly according to FIG. 3 in a neutral position (N) in a longitudinal section.
FIG. 8B shows with part of the gear teeth in a developed view for the assembly according to FIG. 3 in a neutral position (N)
FIG. 8C shows a characteristic curve diagram showing a number of parameters as a function of time for the assembly according to FIG. 3 in a neutral position (N)

In the second switched position (C2), which is shown in FIG. 7, the sliding sleeve 45 is connected to the second output part 44, respectively the driving gear 16, so that torque is transmitted via the second power path which, again, is shown in bold lines. The second power path comprises the driveshaft 9, the input part 42, the second driving gear 16, the second intermediate gear 17, the intermediate shaft 10 and the output gear 18 which engages the annular gear 19.

In total, the drive assembly 2 comprises three pairs of gears: the first driving gear 14 and the first intermediate gear 15 (first pair of gears), the second driving gear 16 and the second intermediate gear 17 (second pair of gears), and the output gear 18 and the annular gear 19 (third pair of gears). Depending on the switch position of the coupling unit 12, drive is effected via the first or the second pair of gears, so that there are obtained two gear stages.

Controlling the electric drive can take place by taking into account, inter alia, a value representing the rotational speed of the driveshaft 9 and a value representing the rotational speed of the intermediate shaft 10 as input values. For example, these can be the motor speed of the electric motor 3 and the wheel speed of the vehicle wheels 83, 84 on the basis of which the rotational speed of the driveshaft 9 and of the intermediate shaft 10 can be determined. Calculating the rotational shaft speeds is important for adapting the rotational speed of the driveshaft 9 to that of the intermediate shaft 10 by means of the electric motor 3. As further input values the electronic control unit receives control signals from the actuating assembly 1, such as which gear is shifted, for controlling the electric drive. This is important to ensure that the electric motor 3 only introduces torque into the drive assembly 2 when the first or the second gear stage has been securely engaged.

The present process of controlling the actuating assembly 1 can comprise the following process steps: sensing a position signal representing the position of the actuating element 45; sensing a force signal representing the operating force required for displacing the actuating element 45; and controlling the actuator drive 46 by means of the electronic control unit depending on the position signal and of the force signal. By using the control-technical link between the position signal and the force signal, calibration of the actuating assembly is possible, so that changes in positions and tolerances occurring during operation can be included for controlling purposes. The position of the switching sleeve 45 can be determined by the position sensor which can be designed as a path sensor or rotational angle sensor. The force sensor can be used to sense all changes in the axial force occurring under operational conditions and can be associated with an associated position of the switching sleeve 45.

For calibrating the assembly, an end position of the switching sleeve 45 is approached in a first coupling process and sensed by a jump in the force signal. This can be seen in FIG. 11C in the form of a peak 85. The end position represents an end stop of the coupling unit 12 in the first and/or second coupling position. At the same time, an associated end position value 86 recorded by the path sensor is stored. During a later coupling operation, the recorded end position value can be taken into account when controlling the actuator drive 46 such that the actuating element 45 is braked prior to reaching the end position. In this way, a high level of switching comfort is achieved.

After the end position has been reached, the actuating element 45 is moved by a defined path into the coupled position which is axially spaced from the end position. This coupled position is shown in FIG. 12, with the slight return movement being indicated by an arrow. The return movement ensures that friction forces are reduced in the coupled condition because axial play is set in the actuating assembly and in the coupling, respectively. The axial distance between the end position and the coupled position, i.e., the path by which the actuating element is returned, can range between zero and 1.0 mm, for example. During a subsequent coupling procedure, the actuator drive 46 can be controlled in such a way that the actuating element 45 is directly moved into the coupling position, i.e., is stopped in the coupling position before the end position is reached.

Figure 9:
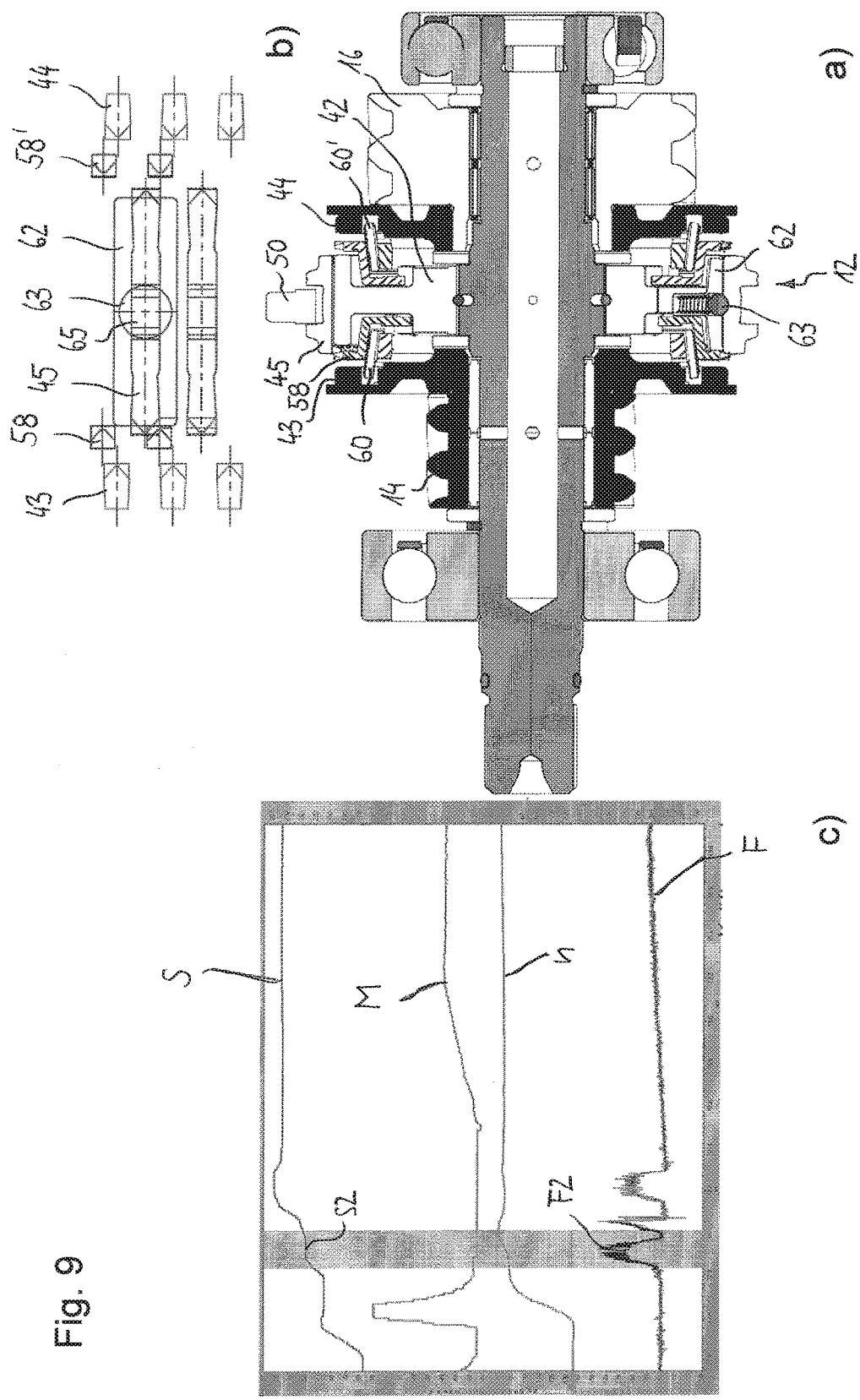
FIG. 9A shows the assembly according to FIG. 3 in a synchronising position (S) in a longitudinal section.
FIG. 9B shows with part of the gear teeth in a developed view for the assembly according to FIG. 3 in a synchronising position (S)
FIG. 9C shows a characteristic curve diagram showing a number of parameters as a function of time for the assembly according to FIG. 3 in a synchronising position (S)

According to a further possibility in respect of calibrating, the drive 46 can be controlled such that the travel speed of the actuating element 45 is reduced before the synchronising position is reached, which is shown in FIG. 9.

If the relative difference in rotational speed between the coupling input part and the coupling output part has not dropped below a predetermined speed differential value after a predetermined period of time, the switching, i.e., coupling, process is interrupted and the sliding sleeve is moved back into the neutral position.

Below, a coupling process, i.e., switching process from the neutral position (N) into the first switched position (C1), is described with reference to FIGS. 8 to 12. FIGS. 8 to 12 show detail a), i.e., the coupling unit 12, detail b), i.e., part of the coupling in a developed view and detail c), i.e., the associated characteristic curve diagram. In the characteristic curve diagram, the upper line shows the position signal (P) of the first sensor means 54, the second line shows the torque M of the electric motor 3 for driving the driving axle of the vehicle, the third line shows the rotational speed n of the electric motor 3, and the lower line shows the forces F effective on the actuating element 45. The graphs shown in the above Figures were determined experimentally; however, in reality, the basic principle is the same. For the sake of simplicity, only some of the reference numbers are shown.

FIGS. 8A to 8C show the neutral position (N) of the assembly. No gear is engaged. For equalizing the rotational speeds between the input part 42 and the output part 43, the motor torque M, and/or the rotational speed n of the electric motor 3 are increased. This range is hatched in grey in the diagram, with the increased value for the motor torque M1 and rotational motor speed n1 being drawn in. Thereafter, the coupler 45 is moved by the actuating element 50, which is driven by the actuator drive 46, towards the coupling position (C1). The sliding blocks contact the contact face of coupler 50 provided in the form of a sliding sleeve while displacing same towards the desired gear stage.

FIGS. 9A to 9C show the pre-synchronising process. The catch members 62 load the outer synchronising ring 58 against the conical face of the intermediate ring 60 which can also be referred to as friction ring. Because of the difference in rotational speed between the sliding sleeve 45 and the output part 43, the outer synchronising ring 58 is rotated, which can be seen in FIG. 9B. The teeth of the sliding sleeve 45 are slightly offset relative to the teeth of the outer synchronising ring 58 in the circumferential direction, so that the sliding sleeve 45 cannot be further switched through as long as there is a speed difference. The switched condition as prescribed is hatched in grey in the diagram. The increased value of the forces F acting at the switching claw, which are given as F2, can be seen. The associated sensor signal is referred to as S2.

As the synchronising operation proceeds, the sliding sleeve 45 continues to be moved, as a result of which it touches the inclined faces at the sliding sleeve and of the outer synchronising ring 58. Herewith, the main synchronising process begins (not shown separately). In connection with the main synchronising process, the switching force as divided between the catch members 62 and the sliding sleeve 45 is introduced via same into the outer synchronising ring 58. During the so-called slipping phase, the sliding sleeve cannot be switched through.

Figure 10:
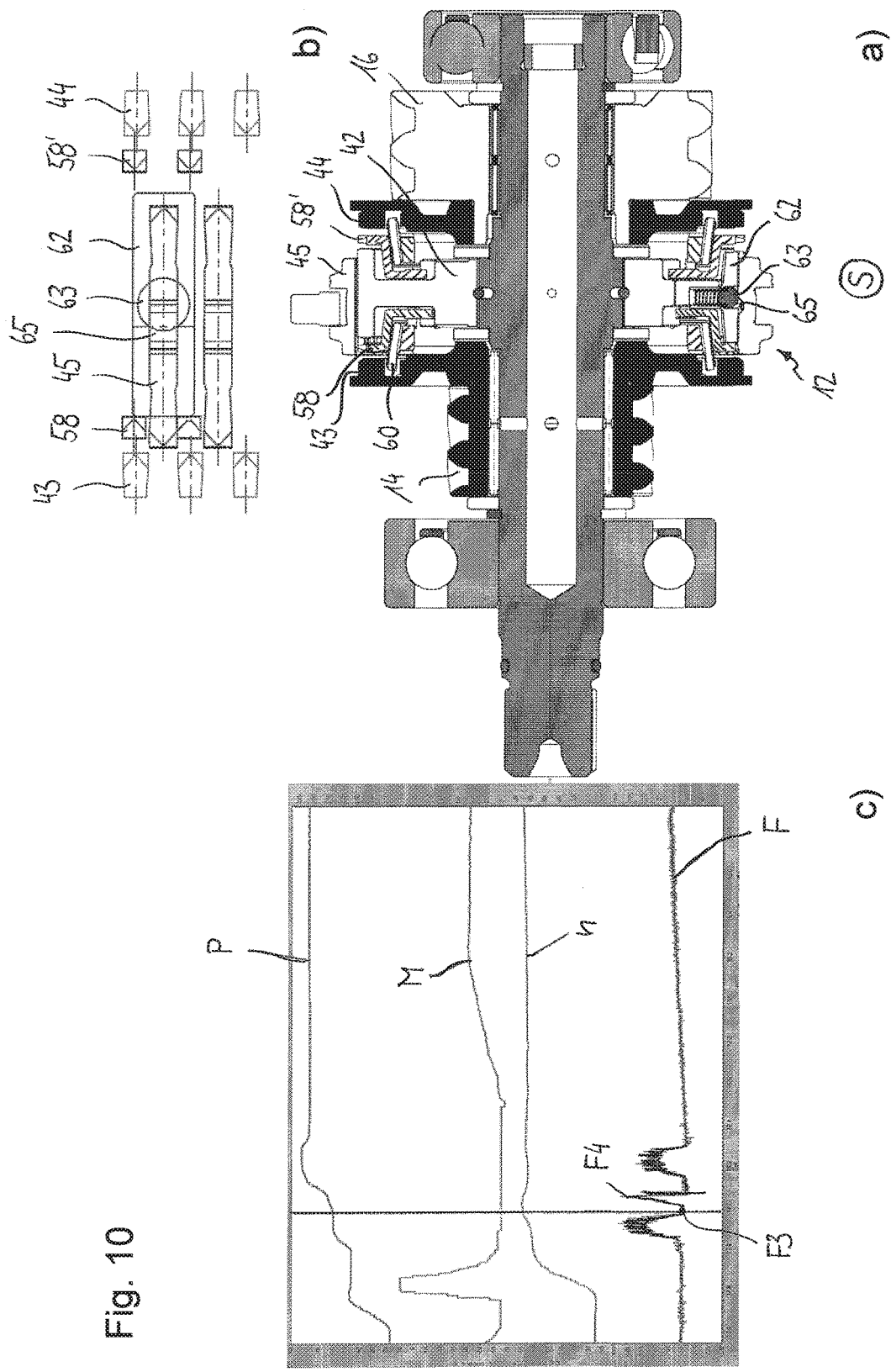
FIG. 10A shows the assembly according to FIG. 3 in a constant velocity position in a longitudinal section.
FIG. 10B shows, for the assembly according to FIG. 3 in a constant velocity position, part of the gear teeth in a developed view.
FIG. 10C shows, for the assembly according to FIG. 3 in a constant velocity position the characteristic curve diagram of FIG. 8C.

As constant velocity (S) is reached, as shown in FIG. 10, the friction moment between the synchronising rings decreases towards zero. As a result, the axial forces acting on the sliding sleeve 45 are reduced correspondingly, which is shown in FIG. 10C as F3. Via the inclined tooth faces, the opening moment of the toothing causes the outer synchronising ring 58 to be turned back relative to the sliding sleeve 45, which can be seen in FIG. 10B. In this position, the sliding sleeve 45 can be further displaced towards the desired gear stage and coupling position respectively. Thereby, the spring-loaded balls 63 of the catch members 62 are passed over, which is the end of the synchronising process.

During the subsequent process stage of engaging the toothing of the sliding sleeve 45 and the toothing of the output part 43, the end-sided tooth inclinations of the sliding sleeve meet the tooth inclinations of the output part 43, which leads to an renewed increase in force shown in FIG. 10B and marked by F4. The sliding sleeve 45 rotates the output part 43 relative to the outer synchronising ring 58. The switching is free, which leads to a reduction in the axial force (F5), and a form-locking engagement between the sliding sleeve teeth and the output gear teeth can be established. FIG. 11 shows this process step in which the sliding sleeve 45 is slid on to the output gear 43. In this way, the power flow between the input gear 42, respectively the driveshaft 9, and the output gear 43 is achieved. The sliding direction is indicated by an arrow.

As the sliding sleeve 45 is further moved, the end stop is reached, which is indicated by a renewed increase in the forces F acting on the sliding sleeve 45 and which is recorded by the force sensor means. The increase in force is marked in FIG. 11C by F6. After the end stop is reached, the switch fork 50 with the sliding block is slightly moved back into the coupled position, which can also be referred to as in-gear position. The return movement, which is indicated in FIG. 12 by an arrow pointing to the right is effected over a distance of 0.5 mm to 1.00 mm. The forces F acting on the switch fork are noticeably reduced again, which is shown in FIG. 12C by F7.

By reaching the coupled position C1, the flow of force from the input gear 42 via the sliding sleeve 45 to the output gear 43, respectively the gear 14 connected thereto, is complete. The electric motor 3 for the electric drive can be electrified, which is indicated by the increasing torque M8.

The invention claimed is:

1. A process of controlling an actuating assembly for a coupling unit in a driveline of a motor vehicle, wherein the actuating assembly comprises an actuator drive for moving an actuating element for actuating the coupling unit, the process comprises:
   sensing a position signal representing a position of the actuating element and simultaneously sensing a force signal representing an operating force required for shifting the actuating element;
   linking the sensed position signal and the sensed force signal for determining an accurate position of the actuating element; and
   controlling the actuator drive by an electronic control unit depending on the sensed position signal and the sensed force signal linked to said sensed position signal.

2. The process according to claim 1,
   wherein in a first coupling procedure, an end position of the actuating element, which represents an end stop of the coupling unit, is sensed by an abrupt increase in the sensed force signal, an associated end position value is stored, and
   then in at least one later coupling procedure, the end position value is taken into account by the electronic control unit when controlling the actuator drive such that the actuating element is braked before the end position is reached.

3. The process according to claim 2, wherein the end position value is defined on the basis of a position signal sensed at the time of the abrupt increase on the sensed force signal.

4. The process according to claim 2, wherein, after reaching the end position, the actuating element is moved by a defined path into a coupling position which is axially spaced from the end position.

5. The process according to claim 4, wherein, at the at least one later coupling procedure, the actuator drive is controlled such that the actuating element is moved directly into the coupling position such that the actuating element is stopped in the coupling position before reaching the end position.

6. The process according to claim 1,
   wherein the coupling unit comprises a synchronizing mechanism which, in a synchronising position of the actuating element, adjusts a first rotational speed of a coupling input part and a second rotational speed of a coupling output part relative to one another, and
   wherein, during a coupling procedure, the actuator drive is controlled such that a travel speed of the actuating element is reduced before the synchronizing position is reached.

7. The process according to claim 6, wherein the travel speed of the actuating element is increased if a relative difference in rotational speed between the coupling input part and the coupling output part drops below a predetermined value of rotational speed difference.

8. The process according to claim 7, wherein the actuating element is returned into a neutral position, if, after a predetermined period, a relative difference in rotational speed remains greater than the predetermined value of rotational speed difference.

9. The process according to claim 1, wherein sensing the position signal comprises at least one of:
   sensing a path signal representing a path of the actuating element and determining the position on the basis of the path signal;
   sensing a rotational signal representing a rotational movement of the actuator drive; and
   determining the position on the basis of the rotational signal.

10. The process according to claim 1, wherein the actuator drive for moving the actuating element is an electric motor, and sensing the force signal comprises:
  sensing an electric current of the electric motor; and
  calculating the force of the actuating element on the basis of the electric current of the electric motor.

11. A drive assembly with a coupling unit in a driveline of a motor vehicle and with an actuating assembly for actuating the coupling unit, wherein, by means of the actuating assembly, the coupling unit is selectively adjustable into a coupling position in which torque is transmitted between a coupling input part and a coupling output part, and into a neutral position in which the coupling input part and the coupling output part are freely rotatable relative to one another, wherein the coupling unit comprises a synchronizing mechanism that effects an adjustment of rotational speed between the coupling input part and the coupling output part before closing into the coupling position, the actuating assembly comprising:
  an actuator drive with a rotationally drivable shaft;
  a rotation translation convertor which converts a rotational movement of the shaft into a translatory movement of an actuating element;
  a first sensor to sense a position signal which represents the translatory movement of the actuating element;
  a second sensor to sense a force signal representing a force of the actuator drive; and
  an electronic control unit for controlling the actuator drive, wherein the electronic control unit is connected to the first sensor and to the second sensor for linking a sensed position signal and a sensed force signal with each other for accurately determining the position of the actuating element and for controlling the actuator drive.

12. The drive assembly according to claim 11, wherein the first sensor comprises a path sensor which senses at least indirectly a movement of the actuating element, wherein a sensor target is provided so as to jointly move with the actuating element and whose position is detectable by the first sensing means.

13. The drive assembly according to claim 11,
  wherein the first sensor comprises an angle of rotation sensor which at least indirectly senses a rotational movement of the actuator drive, wherein the position of the actuating element is determined on the basis of the sensed rotational movement of the actuator drive.

14. The drive assembly according to claim 11,
  wherein the second sensor comprises an electric current sensor which senses electric current requirements of the actuator drive.

15. The drive assembly according to claim 11, wherein:
  the rotation translation convertor comprises a threaded spindle with a spindle part which is rotatingly drivable by the shaft, and
  a translation part threadingly connected to the spindle part which translation part is guided relative to a housing in a rotationally fixed and longitudinally movable way, so that a rotation of the spindle part effects an axial movement of a translation part,
  wherein the actuating element is axially fixed to the translation part.

16. The drive assembly according to claim 11, wherein:
  the coupling input part is connected to a driveshaft in a rotationally fixed way, and
  the coupling output part is connected in a rotationally fixed way to a first drive gear rotatably supported on the driveshaft.

17. The drive assembly according to claim 11,
  wherein the coupling unit comprises two coupling output parts,
  wherein a coupler is provided which is firmly connected to the actuating element of the actuating assembly, and
  wherein the coupler is movable:
    into a neutral position in which the coupling input part, the first coupling output part and the second coupling output part are freely rotatable relative to one another, or
    into a first coupling position in which the coupling input part is connected to the first coupling output part for transmitting torque, or
    into a second coupling position in which the coupling input part is connected to the second output part for transmitting torque.

18. The drive assembly according to claim 17, wherein the coupler is provided in the form of a sliding sleeve which is held in a rotationally fixed and axially displaceable way relative to the coupling input part.

* * * * *